Patented July 10, 1934

1,965,923

UNITED STATES PATENT OFFICE 1,965,923

BASE-EXCHANGE BODY

Robert Griessbach, Wolfen, near Bitterfeld, and Karl Neundlinger, Dessau in Anhalt, Germany, assignors to I. G. Farbenindustrie Aktiengesellschaft, Frankfort-on-the-Main, Germany No Drawing. Application March 27, 1931, Serial No. 525,866. In Germany July 18, 1930

6 Claims. (Cl. 23—113)

Our invention relates to the manufacture of base-exchange bodies of great hardness, uniform shape and high resistance to hot and corroding waters.

It is based on the observation that valuable base-exchange bodies are obtainable by forming from water glass solutions and alkali aluminate solutions a gelatinous mass which is homogenized, advantageously with addition of plasticizing substances, and then subjected to a shaping process. The bodies obtained, for instance, in the form of granules, pellets or small cylinders, are then slightly sintered or baked by heating them to over 100° C., preferably to a temperature not exceeding 150° C., whereby they are enabled to retain their form when exposed to water; they are then washed with water and dried.

The mixture made from water glass and alkali aluminate need not at first be thoroughly homogeneous, since it is homogenized in a suitable device, for instance, in a ball mill. To this end, additions of plasticizers, for instance, kaolin, bentonite, cellulose waste liquor, etc. are advantageous and such substances may already be present while the mass is being produced. The pasty mass thus obtained is now formed by means of an apparatus which produces bodies of a uniform shape, such as perforated sheet iron, a girth, an extrusion press and so forth, or by squirting it. According to the method applied in each case for the forming of the bodies, there can be obtained spherical, cylindrical, granular and similar bodies of any desired uniform size.

The proportions of water glass to aluminate may vary within certain limits. We prefer a ratio of 1 part of $Al_2O_3$ to about 6 to 12 parts of $SiO_2$. By using considerable proportions of aluminate, the strength of the grains is reduced, whereas by using too large a quantity of water glass the grains gradually inflate during the subsequent baking operation at a temperature of over 100° C., whereby their strength is likewise reduced.

Insofar as the formed bodies are not strengthened during the forming process itself, this can be initiated by slightly drying them, for instance, with warm air. It is, however, also possible to remove a part of its water from the mixture before it is shaped by treating it with steam, for instance, in a vessel provided with a perforated false bottom. Thereby the mass shrinks and loses 30 to 50% of its water content, excess of alkali and silicic acid and small quantities of alumina passing into solution. After this step only the product is subjected to the homogenizing operation.

The formed bodies obtained by either method are then slightly sintered by heating them to a temperature of over 100° C. preferably not considerably exceeding 150° C., whereby their form is rendered stable to the action of water. Heating to a temperature higher than 150° C. causes a swelling up of the sodium silicate used in excess as a binding agent and thus reduces the strength of the end products. When keeping, however, the temperature during this heating operation in the aforementioned range, namely between above 100° C., and not higher than 150° C., a sintering of the excess silicate occurs, and thus, the sodium silicate acts as a binding agent forming a frame work for the artificial material. The bodies must be heated rapidly, advantageously, for instance, in a revolving drum, that is to say, the whole drying process must be complete in about 3 hours down to 1 hour or even in a shorter period and the dehydration is controlled preferably by maintaining a moist atmosphere, such that the final product may contain at least 15 and at the most 25% of water. The granules whose form is now stable to water are freed, by washing them, from any excess of soluble compounds, and, according to requirement, dried to become ready for transport.

The new base-exchange bodies are characterized as compared with those hitherto known, by their uniformity of shape and granulation and by their high solidity. Whereas known commercial products, by rubbing between the palms of the hands, can be reduced to a great extent to powder, the like occurs only to a very small extent in the case of the products obtainable according to this invention. Contrary to the very fine-grained base-exchange bodies obtained from natural earths, they involve the advantage that they can be produced in any size of the grain, viz. with a diameter from half a millimeter to several millimeters. Their capacity of exchanging the base is extremely high and excels that of the base-exchange bodies hitherto known. Their stability to hot water and water containing carbonic acid is greater than that of similar products, obtained from the same starting materials.

The following examples illustrate the invention:—

*Example 1.*—30 to 35 parts of a solution of sodium aluminate of specific gravity 1.075

$$(NaO:Al_2O_3=0.94:1)$$

are run while stirring well at an ordinary temperature into 100 parts of a water glass solution of specific gravity 1.09 ($Na_2O:SiO_2=1:3.4$). The jelly obtained is ground for some hours in the ball mill and the pasty mass is applied on perforated iron sheets and predried in a drier at 70 to 80° C. for about 5 to 10 minutes. The dried and slightly shrunk cylinders of jelly can be removed from the iron sheets by knocking. They are then quickly heated in an externally heated drum, while maintaining in the drum a moist atmosphere, until the temperature in the moving mass amounts to 110-120° C. There are obtained granules of the same cylindrical shape but feebly shrunk, which contain about 20% of water and are no longer disintegrated when subsequently washed with cold or hot water. The washed granules are filtered by suction and, if required, subsequently dried slightly.

The capacity of the base-exchange body obtained amounts to 4% of CaO. When perforated iron sheets, in which each perforation has a diameter of 2 mm. are used the finished product has a uniform granulation of about 1 mm.

*Example 2.*—100 parts of a water glass solution composed as indicated in Example 1, are mixed with 35 parts of a solution of sodium aluminate. Before the formation of the jelly, or during the grinding, 2.7 parts of kaolin are added. The further treatment is as in Example 1. Instead of kaolin or besides kaolin cellulose sulfite liquor may be used.

*Example 3.*—The batch is the same as in Example 2. Before grinding, the jelly is exposed for about 4 hours to the action of a current of steam in a vessel having a perforated bottom and perforated walls. The jelly shrinks by losing about 40% of the water contained in it. The mass is then ground in the ball mill and is further treated as indicated in Example 1. The product shows high mechanical strength and stability to hot water and to carbonated water.

Our invention is not limited to the foregoing examples or to the specific details given therein. Thus, for instance, bodies of greater size up to 2 and more millimeters may be produced by choosing an iron sheet having perforations of a diameter greater than 2 mm. or by using, for instance, an extrusion press having a mouth of corresponding form and diameter. The amounts of alkali silicate and alkali aluminate may be varied in the ratio mentioned above, if base-exchanging bodies of peculiar properties for use with a specific water are required.

What we claim is:—

1. Base-exchange bodies consisting of alkali metal silicate and alkali metal aluminate, having the form of grains of even size and a diameter from half a millimeter to several millimeters, retaining their form when rubbed between the palms of the hands, being stable to hot water and to water containing carbonic acid and which has been produced in accordance with claim 2.

2. In the manufacture of base-exchange bodies the steps which comprise thoroughly mixing an aqueous solution of an alkali metal silicate and of an alkali metal aluminate in such a ratio that the mixture contains about 1 part of $Al_2O_3$ and about 6 to 12 parts of $SiO_2$, and in such a concentration as to develop a gel body, shaping the mixture, heating the molded bodies rapidly to a temperature over 100 to about 150° C., washing the bodies with water and drying them.

3. In the manufacture of base-exchange bodies the steps which comprise thoroughly mixing an aqueous solution of an alkali metal silicate and of an alkali metal aluminate in such a ratio that the mixture contains about 1 part of $Al_2O_3$ and about 6 to 12 parts of $SiO_2$, and in such a concentration as to develop a gel body, treating the mixture with steam and shaping it, heating the molded bodies rapidly to a temperature over 100 to about 150° C., washing the bodies with water and drying them.

4. In the manufacture of base-exchange bodies the steps which comprise thoroughly mixing an aqueous solution of an alkali metal silicate and of an alkali metal aluminate in such a ratio that the mixture contains about 1 part of $Al_2O_3$ and about 6 to 12 parts of $SiO_2$, and in such a concentration as to develop a gel body, treating the mixture with steam and shaping it, heating the molded bodies rapidly to a temperature over 100 to about 150° C. for 1 to 3 hours, washing the bodies with water and drying them.

5. In the manufacture of base-exchange bodies the steps which comprise thoroughly mixing an aqueous solution of alkali metal silicate and of an alkali metal aluminate in such a ratio that the mixture contains about 1 part of $Al_2O_3$ and about 6 to 12 parts of $SiO_2$, and in such a concentration as to develop a gel body, shaping it, heating the molded bodies rapidly to a temperature over 100 to about 150° C. in the presence of steam, until their water content is reduced to about 15 to 25%, washing the bodies with water and drying them.

6. In the manufacture of base-exchange bodies the steps which comprise thoroughly mixing an aqueous solution of an alkali metal silicate and of an alkali metal aluminate in such a ratio that the mixture contains about 1 part of $Al_2O_3$ and about 6 to 12 parts of $SiO_2$, and in such a concentration as to develop a gel body, grinding the jelly formed with kaolin, shaping the mixture, heating the molded bodies rapidly to a temperature over 100 to about 150° C in the presence of steam, until their water content is reduced to about 15 to 25%, washing the bodies with water and drying them.

ROBERT GRIESSBACH.
KARL NEUNDLINGER.